Figure 1:
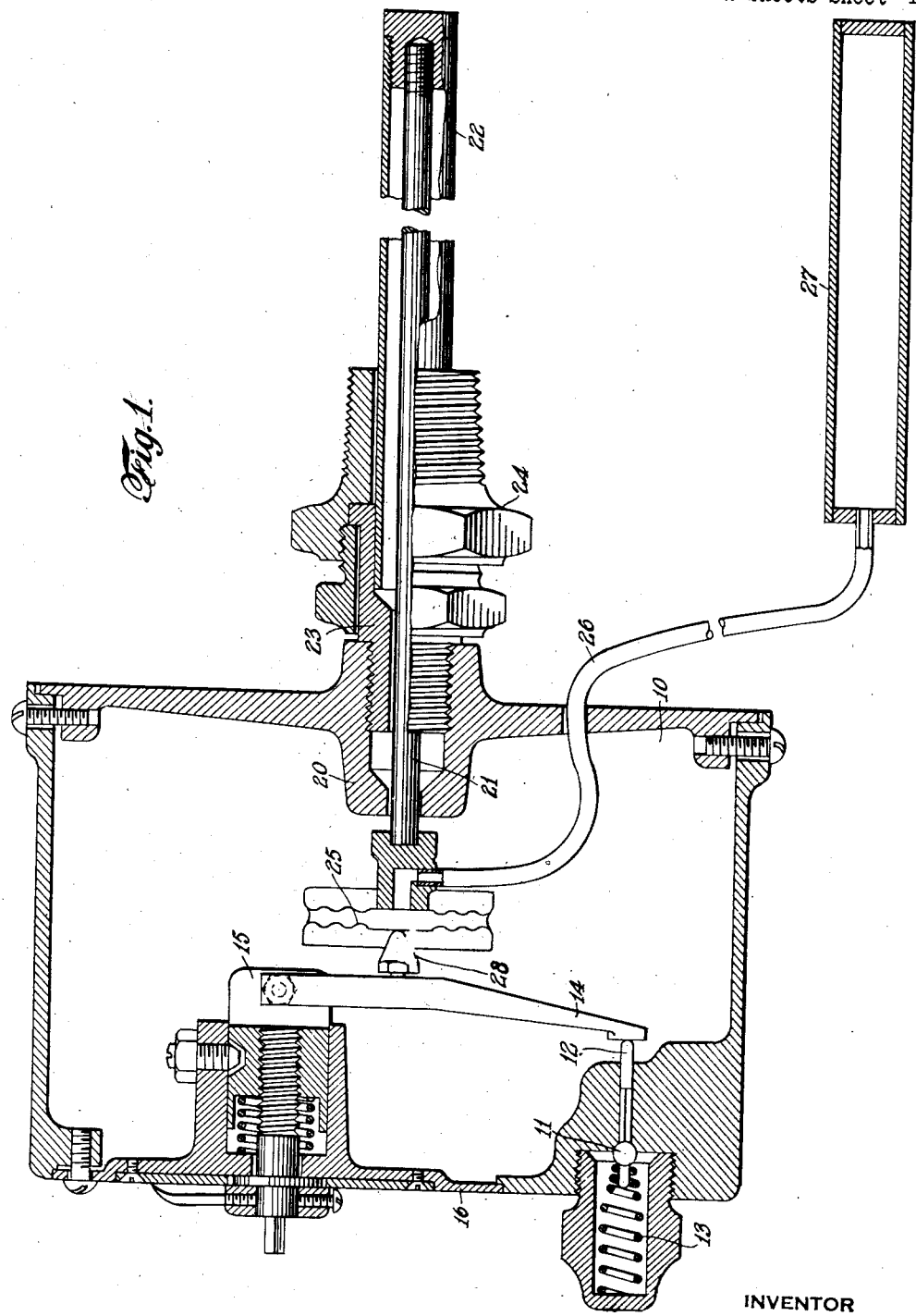

Feb. 28, 1933.  A. R. MABEY  1,899,516
CONTROL APPARATUS
Filed Feb. 4, 1930   2 Sheets-Sheet 1

INVENTOR
ARTHUR R. MABEY
BY
ATTORNEY

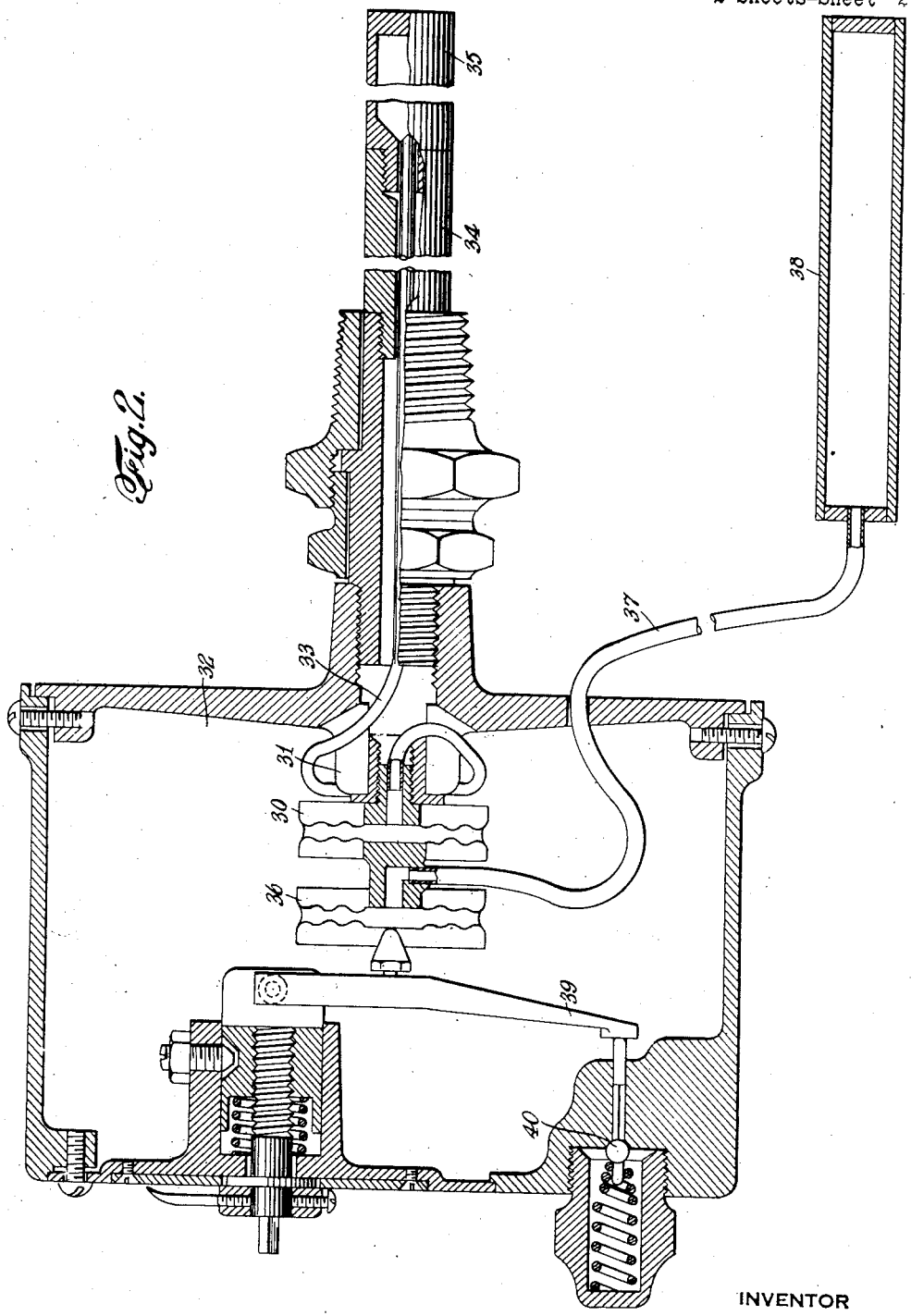

Patented Feb. 28, 1933

1,899,516

UNITED STATES PATENT OFFICE

ARTHUR R. MABEY, OF WATERBURY, CONNECTICUT, ASSIGNOR TO THE BRISTOL COMPANY, OF WATERBURY, CONNECTICUT, A CORPORATION OF CONNECTICUT

CONTROL APPARATUS

Application filed February 4, 1930. Serial No. 425,852.

The invention relates to control apparatus operating under the influence of two variable conditions and designed for the control of some third condition or device, as, for example, in the control of the supply of a fluid to the device in accordance with the varying conditions to which the control apparatus is subjected.

It has for its object a simple and effective apparatus of this character which will respond rapidly to changes in either or both of the conditions. A further object of the invention resides in the provision of a comparatively inexpensive and rugged device for this purpose.

In carrying out the invention, a pair of independently operable expansion members are connected to each other, the one being carried by the other at its outer end and whose opposite end is secured; and motion-transmitting means are associated with the free end of the carried member to transmit, for control purposes, the algebraic sum of the movements of the respective expansible members.

The nature of the invention, however, will best be understood when described in connection with the accompanying drawings, in which:

Fig. 1 is a longitudinal section, with portion shown in elevation, of the novel control apparatus; and Fig. 2 is a similar view illustrating a modification.

Referring to the drawings, 10 designates a suitable casing or enclosing housing for the head of the apparatus, the same carrying, for example, a fluid-controlling valve 11 which is designed to be moved off its seat in accordance with two variable conditions, as will be hereinafter more fully set forth, to permit or shut off the flow of fluid through said valve, said fluid passing therethrough in turn controlling further apparatus (not shown).

The operation and control of apparatus by the control of a fluid thereto is well understood and forms no particular part of the present invention, which relates more especially to a means for regulating the movement of valve 11 in accordance with two variable conditions. To this end, valve 11 is connected to a stem 12 which projects into the housing 10 and is urged outwardly to seat the valve 11 by a spring 13. The outer end of stem 12, moreover, bears upon the end of a lever 14 which is pivoted to an adjustable fulcrum 15 carried by the housing, or rather a cover plate 16 removably secured thereto for convenience in assembly.

Passing through the housing and mounted in a hub 20 thereof is an axially disposed rod 21 which is secured at its outer end to a surrounding tube or protective casing 22 soldered to a stud 23 screwed into the hub 20. A nut 24, moreover, may be provided for securing, if desired, the aforesaid apparatus to a tank, furnace or other apparatus (not shown) and in which prevails a variable condition, for example, a changing temperature.

In the particular embodiment indicated, rod 21 and its enclosing casing 22 are adapted for a differential movement under the influence of a change in temperature; and the former may, therefore, be of a metal or alloy such as so-called "invar" which has a substantially zero coefficient of expansion, while the surrounding casing 22 may be of brass. Under these conditions, rod 21 will be projected into or withdrawn from the housing 10 in accordance with the particular temperature conditions prevailing about said enclosing casing 22.

Rod 21, furthermore, carries and has rigidly secured thereto one end of an expansible diaphragm member 25 to which a fluid may be introduced through the flexible connection 26 and at whose other end is located a suitable bulb member 27 adapted to be subjected to a further variable condition, as, for example, a change in temperature. A change in the fluid pressure caused by the change in the condition at bulb 27 will, therefore, be reproduced by a corresponding movement of diaphragm 25, as is well understood; and the two conditions prevailing at casing 22 and bulb 27 will, therefore, determine the combined movement of rod 21 and its superposed diaphragm member 25 floating thereon, the actual resultant movement being the algebraic sum of the movements of the two individual members. This resultant movement is then communicated to lever 14 through a suitable stud or pin 28 secured to the latter and bearing upon the diaphragm member 25, said lever being under a tension due to spring 13.

In Fig. 2 a modification is illustrated, the bimetallic expansion device being substituted by a fluid-actuated diaphragm member 30 which is rigidly secured at one end to a hub 31 of the housing 32. A flexible connection 33 therefrom for fluid extends outwardly of the housing into the enclosing tube or casing 34 to a bulb 35 secured at its outer end and containing a suitable fluid changing in pressure with, for example, variations in temperature. To the free end of diaphragm member 30 is secured a further diaphragm member 36 similar to the diaphragm member 25 of the previously described embodiments; and the same communicates through a flexible tubular connection 37 with a bulb 38 containing a fluid for influencing the movement of said diaphragm 36. Diaphragm member 36 thus floats between the diaphragm member 30 and lever 39, operating the valve 40, the resultant movement of the two diaphragm members imparted to the said lever being the algebraic sum of their movements and thus influenced by two variable conditions, as before.

I claim:

1. Control apparatus comprising two independently expansible members having a common axis of expansion and the one being secured at one end and at its opposite end carrying the other member, means operatively associated with the free end of the last-named expansion member for communicating the algebraic sum of their combined movements, and respective means responding to different conditions to cause movement of each of said expansible members under variations in conditions to which said means are exposed, the entire resulting linear movement of its members being transmitted along the axis common to said expansion members.

2. Control apparatus comprising a housing, a tube extending therefrom, a rod mounted within said tube and secured at its outer end to the corresponding end of the tube, the free end of the rod projecting into said housing and the rod and tube being of material having different coefficients of expansion whereby when the said tube is exposed to a change of temperature the free end of the said rod will be caused to be correspondingly moved within the housing, and a diaphragm expansion member carried by the free end of said rod, means containing expansible fluid communicating therewith for moving said diaphragm member independently of the rod, and means operatively associated with the free end of the last-named expansion member for transmitting the combined movement of the rod and diaphragm member.

3. Control apparatus comprising two independently expansible members having a common axis of expansion and the one being secured at one end and at its opposite end carrying the other member, a yielding and bodily movable abutment for the free end of the last-named expansion member for communicating the algebraic sum of their combined movements, and respective means responding to different conditions to cause movement of each of said expansible members under variations in conditions to which said means are exposed.

4. Control apparatus comprising two independently expansible members having a common axis of expansion and the one being secured at one end and at its opposite end carrying the other member, a yielding and bodily movable abutment for the free end of the last-named expansion member for communicating the algebraic sum of their combined movements, means to adjust said abutment relatively to the said free end, and respective means responding to different conditions to cause movement of each of said expansible members under variations in conditions to which said means are exposed.

In testimony whereof I affix my signature.

ARTHUR R. MABEY.